United States Patent [19]
Adams

[11] Patent Number: 5,142,532
[45] Date of Patent: Aug. 25, 1992

[54] COMMUNICATION SYSTEM

[75] Inventor: John L. Adams, Felixstowe, England

[73] Assignee: British Telecommunications Public Limited Company, United Kingdom

[21] Appl. No.: 601,701

[22] PCT Filed: Mar. 21, 1989

[86] PCT No.: PCT/GB89/00299
§ 371 Date: Oct. 30, 1990
§ 102(e) Date: Oct. 30, 1990

[87] PCT Pub. No.: WO89/09518
PCT Pub. Date: Oct. 5, 1989

[30] Foreign Application Priority Data
Mar. 24, 1988 [GB] United Kingdom ............... 8807050

[51] Int. Cl.$^5$ .......................... H04J 3/24; H04H 1/08
[52] U.S. Cl. .................... 370/94.1; 370/85.1; 455/5.1
[58] Field of Search ............ 370/24, 29, 30, 50, 370/58.1, 60, 60.1, 68, 68.1, 85.1, 85.2, 85.6, 85.7, 85.8, 85.13, 85.15, 94.1, 94.2, 95.1, 95.3, 100.1, 104.1, 110.1, 112, 118; 340/825.05, 825.06, 825.07, 825.07, 825.08, 825.5, 825.51; 358/84, 86; 455/2, 5

[56] References Cited

U.S. PATENT DOCUMENTS

| | | | |
|---|---|---|---|
| 4,430,731 | 2/1984 | Gimple et al. | 370/30 |
| 4,633,462 | 12/1986 | Stifle et al. | 370/85.1 |
| 4,694,453 | 9/1987 | Kobayashi et al. | 370/85.1 |
| 4,697,263 | 9/1987 | Beaufoy | 370/85.1 |
| 4,773,065 | 9/1988 | Kobayashi et al. | 370/85.1 |
| 4,774,706 | 9/1988 | Adams | 370/94.1 |
| 4,817,088 | 3/1989 | Adams | 370/94.1 |
| 5,008,663 | 4/1991 | Adams | 340/825.5 |
| 5,043,982 | 8/1991 | Werner | 370/100.1 |

FOREIGN PATENT DOCUMENTS 0138365 4/1985 European Pat. Off. .
0168265 1/1986 European Pat. Off. .
0182601 5/1986 European Pat. Off. .

OTHER PUBLICATIONS

IEEE International Conference on Communications 1985, 23–26 Jun. 1985, Chicago, Ill., vol. 2, IEEE (New York, US) S. Arenaccio et al., "Asynchronous Techniques for Burst Time Plan Changes in the ITALSAT System", pp. 987–993.
Patent Abstracts of Japan, vol. 8, No. 70 (E-235), Apr. 3, 1984, & UP, A, 58218250 (Mitsubishi Denki K.K.) Dec. 12, 1983.
Electronics Letters, vol. 23, No. 24, Nov. 19, 1987, (Stevenage, Herts, GB), J. R. Stern et al.: "Passive Optical Local Networks for Telephony Applications and Beyond"—pp. 1255–1257.
IBM Technical Disclosure Bulletin, vol. 18, No. 2, Jul. 2, 1975, (New York, US), R. L. West: "Time-Frame Structure for TDMA Communication" p. 484.

Primary Examiner—Benedict V. Safourek
Assistant Examiner—Alpus H. Hsu
Attorney, Agent, or Firm—Nixon & Vanderhye

[57] ABSTRACT

A bidirectional broadband and telephony network is controllable from an exchange or head end of the network. An optical fiber (16) carries the telephone services to customers' premises (30, 31) via passive optical splitters (17, 18). Telephony is provided on one wavelength, broadcast TV on a second wavelength, and bidirectional asynchronous time division information on another wavelength using ATD techniques. Time-slots are allocated for information packets so they can travel without interference to and from receiving stations and the round trip delay between stations is adjusted to achieve this whilst maintaining minimum bandwidth requirements. Dynamic allocation of spare capacity is provided for bursty services.

49 Claims, 7 Drawing Sheets

COMMUNICATION SYSTEM

BACKGROUND

1. Field of the Invention

The invention relates to communication systems and to such systems employing a passive network, for example a passive optical network. Such passive networks control the operation of the network at the local exchange or head end for a number of customers.

2. Prior Art and Other Considerations

For telephone companies, optical fibres have the capacity to handle a range of services beyond telephony.

In the past, coaxial cable TV networks have, in the main, been used totally separately from the telephone network. It is now becoming clear that beyond the development of the switched-star network and improved advanced optical fibre technology, there is a need for a more flexible telephony based system with additional services provided.

SUMMARY

The present invention is concerned with a configuration capable of producing an enhanced service capability typically on a local fibre network using passive networks employing optical splitting to reduce and share costs.

According to the invention there is provided a bidirectional broadband and telephony network controllable from the exchange or head end of the network including means at the exchange or head end for allocating time slots for information packets to travel without interference to and from a plurality of receiving stations, wherein the allocating means includes means for determining the round-trip delay between the exchange or head end and each of the receiving stations and means for adjusting the round trip delay to ensure correct spacing of the information packets during passage through the network, and includes means for interrogating stations and enforcing allocation thereto to ensure each stations minimum bandwidth requirements are fulfilled, and means for dynamically allocating spare capacity to each station for bursty services.

BRIEF DESCRIPTION OF THE DRAWINGS

The invention will be described by way of example with reference to the accompanying drawings in which:-

DETAILED DESCRIPTION OF THE DRAWINGS

Figure 1:
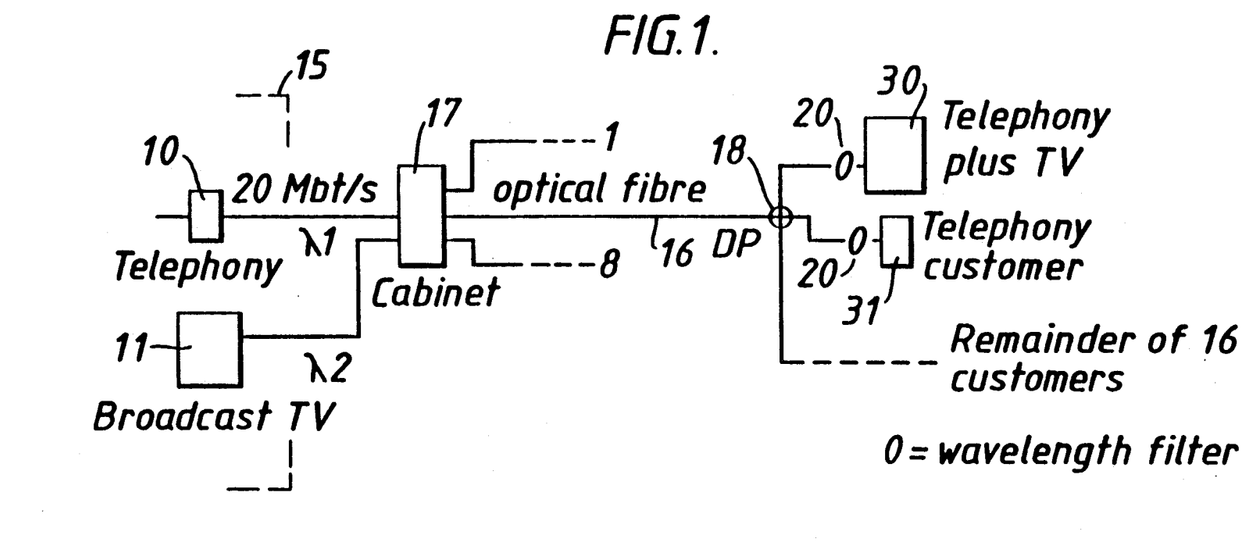
FIG. 1 shows a network configuration capable of handling telephony and broadband services eg broadcast TV).

FIG. 1 shows a proposed configuration for a passive optical network. The exchange telephony block 10 provides telephony at a rate typically 20 Mbit/s on one wavelength ($\lambda 1$) and the TV block 11 provides broadcast TV on a second wavelength ($\lambda 2$) and these pass to the local exchange end 15.

A single mode optical fibre (16) is fanned out to a number of customers premises (30, 31) via passive optical splitters (17, 18) located at the cabinet (c) and street Distribution Point (DP) positions respectively, for example. An 8-way split is allowable at the cabinet and a 16-way split at the DP. However, the maximum amount of splitting is selected to be 32 to keep within the optical power budget available for broadband bit-rates in this particular configuration.

For customers requiring telephony only, current system design views are favoring a network which features a maximum optical split up to 128 ways and a highest bitrate of operation of 20 Mbit/s. This bitrate/split combination allows an attractive set of options for both business and residential customers. At the maximum split of 128 (120 customers plus 8 test ports), capacity would be available to feed each customer, if desired, with an ISDN 144 bit/s channel or equivalent capacity. For business districts, where multiple line customers are in the majority, a lower optical split would be employed, allowing higher capacities to be delivered per customer.

The advantages of a passive telephony network of this kind include low maintenance costs, reduced amounts of installed fibre, low fibre count cable requirements and sharing of exchange opto-electronic devices.

For broadband services the total number of customers can be increased to 128 by using 4 feeds from the head end to the cabinet. Each feed splits 32 ways. In addition, the single telephony-only feed can be split over the same fibre paths to all 128 customers because of its smaller bit-rate.

Figure 2:
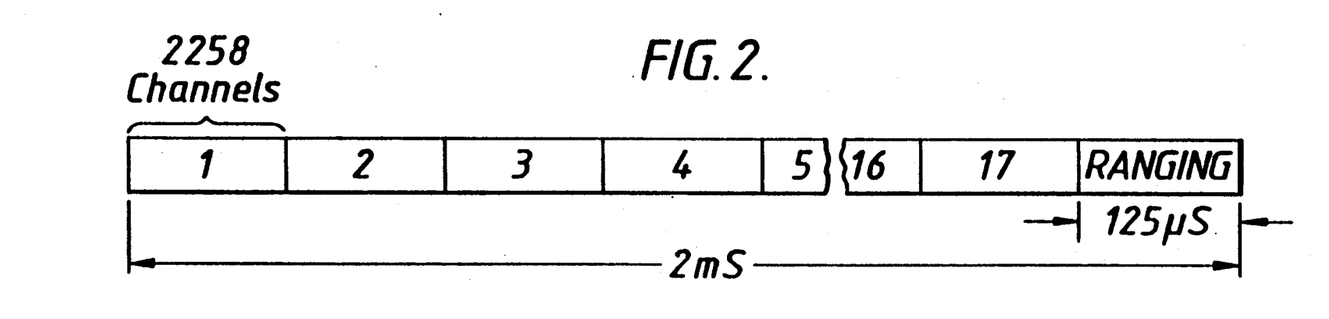
FIG. 2 shows one example of the frame structure of the telephony channel of FIG. 1.

An example of the frame structure of the telephony channel for FIG. 1 is shown in FIG. 2.

Whilst the FIG. 1 configuration can handle telephony and broadcast TV there is a need to provide broadband services in both directions for viewphone or high speed data handling.

Although these services could theoretically be provided (ignoring costs and other constraints) by employing separate wavelengths to and from each customer, however a different approach now proposed which could prove to be less costly and also capable of realization much more readily is to carry such services by introducing two new channels, one for upstream (i.e. customer to local exchange) and one for downstream connections (local exchange to customer).

Figure 3:
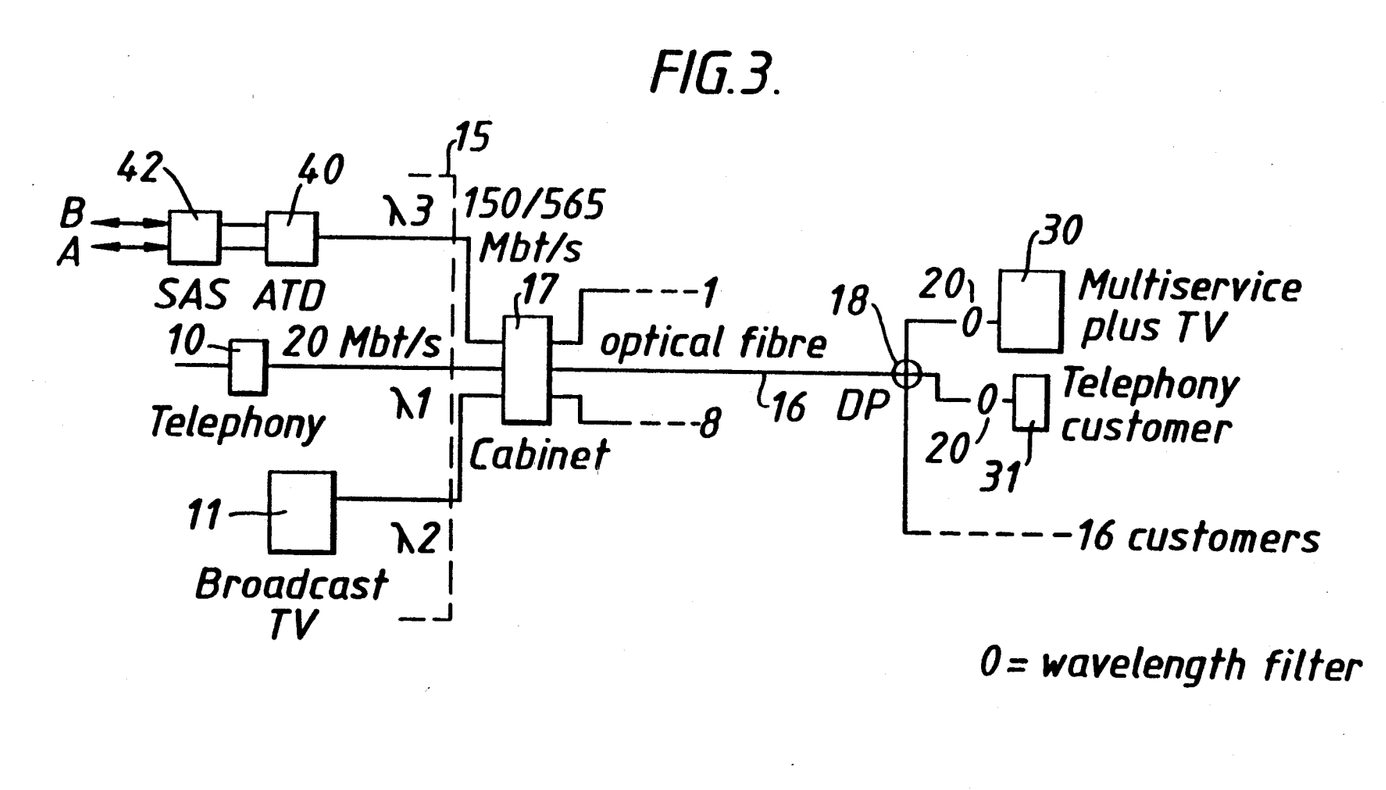
FIG. 3 shows an expanded configuration capable of handling broadband dialogue services.

FIG. 3 shows the proposed configuration capable of handling the additional facilities. Individual connections are multiplexed within these channels using ATD (Asynchronous time division) and carried using a common new wavelength for the two directions of transmission.

To control the multiplexing of upstream information in one form of the embodiment, it is proposed to convey information via the telephony channel to update the exchange end on the condition of queues at each customer's end. The second form of the embodiment conveys all information on the condition of queues using the ATD channel.

Furthermore, in either form of the embodiment at the local exchange the ATD channel would be routed as shown via the service access switch 42 (also based on ATD) and used as a very flexible integrated access channel for any customer requiring a mix of broadband and narrowband services. Hence terminal A of the switch 42 could handle incoming and outgoing information to/from the ATD Broadband network and terminal B will handle incoming and outgoing information from other networks.

The ATD channels are handled by ATD block (40) using wavelength 3 and for both outgoing and incoming information which will pass via the local exchange end 15 in optical form to be handled with other broadband or narrow band services. This wavelength carries two channels, one for the downstream directions to the customers and one for the upstream direction from the customers end to the exchange.

All ATD packets from the exchange end are received by all customers and the actions performed are determined by header information such that a customer will accept the packet and/or re-use the packet for upstream communication or ignore the packet.

An ATD channel bit rate of about 150 Mbit/s shared over 32 customers produces and average capacity of about 4 Mbit/s per customer. Given that ATD dynamically assigns capacity, it is expected that customers will usually be able to obtain much higher capacities on demand (eg a high probability of least 15 Mbit/s). Also, in either form of the embodiment almost the entire capacity of the link can be utilized by a single customer during those times when other customers are idle. Thus a gross bit rate of 150 Mbit/s for the ATD channel could be suitable for a wide range of business customers having bursty data services and narrowband services to transmit. In the longer term it will also be suitable for residential customers requiring viewphone connections. At the moment it is not foreseen whether constant bit rate or variable bit rate video codecs will be used for viewphone (the latter perhaps based on a mean bit-rate of 64 kbit/s and a peak bit rate of 384 kbit/s. However the ATD channel does not restrict the choice since it would be capable of carrying either format.

Very large bit rate services (broadcast TV) are carried on separate wavelengths (i.e. on wavelength λ2). Therefore the bit rate required per customer on the ATD channel is significantly smaller than would be required if ATD carried a full range of services.

The proposed ATD configuration lends itself to being retrofitted to the FIG. 1 arrangement or to a telephony only passive optical network of the type disclosed, without replacing the entire network.

In either form of the embodiment shown, the ATD channel is provided with its own specific wavelength for the upstream and downstream direction, and customers' equipments are fitted with a wavelength filter (20) to receive this channel. Customer 30 can have the capability of multiple services including ATD, telephony and broadcast TV. The customer 31 still only needs the telephony service and therefore is so restricted.

The ATD channel carries a digital multiplex with a gross bit rate of either 150 Mbit/s or 600 Mbit/s for example.

Figure 4:
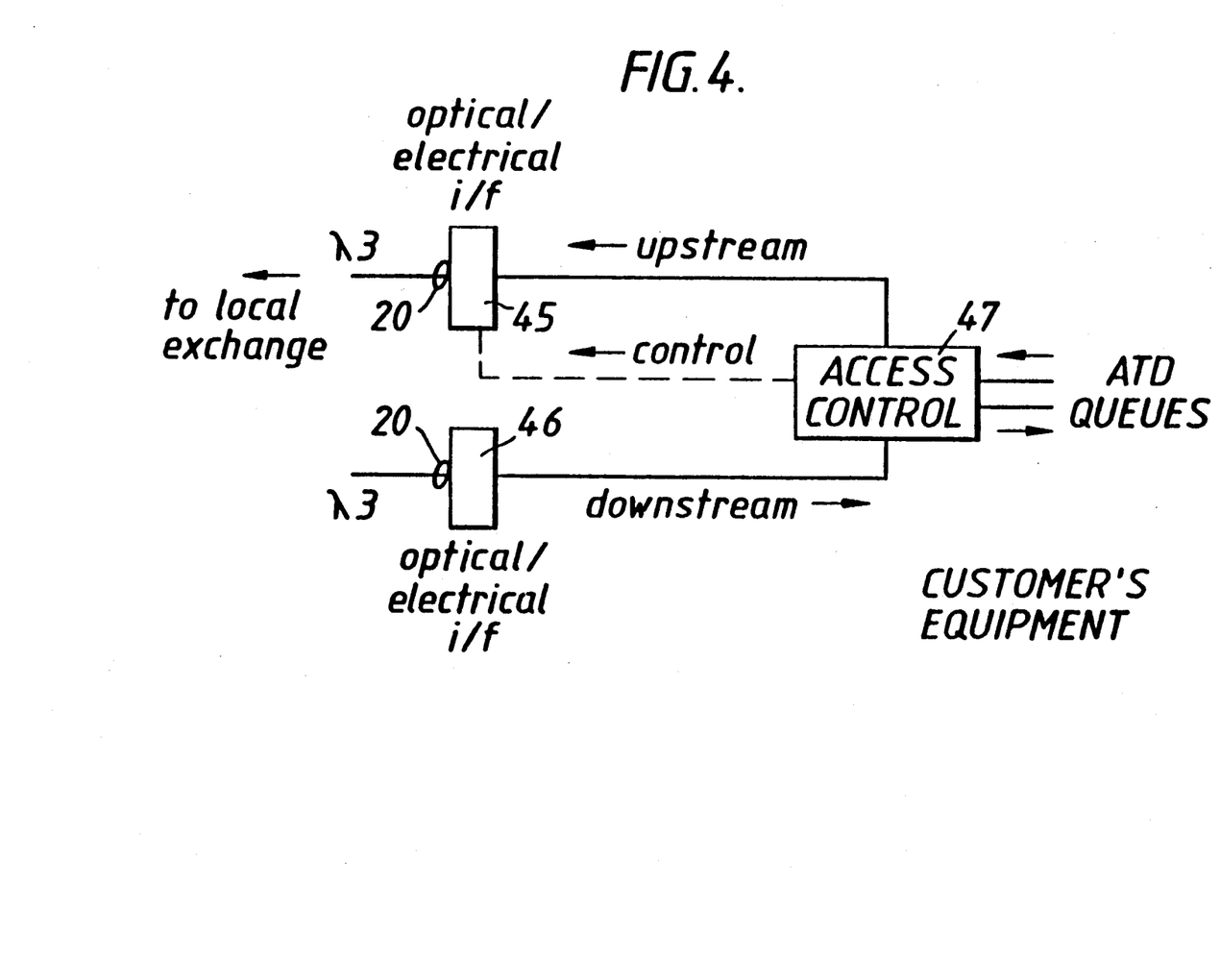
FIG. 4 shows the customer end configuration of the ATD channel.

The ATD channel is handled at the customer's end as shown in FIG. 4. A wavelength filter (20) is associated with each channel and at optical/electrical interfaces (45, 46) data is buffered respectively to and from the local exchange end (via the distribution point and cabinet).

Figure 5:
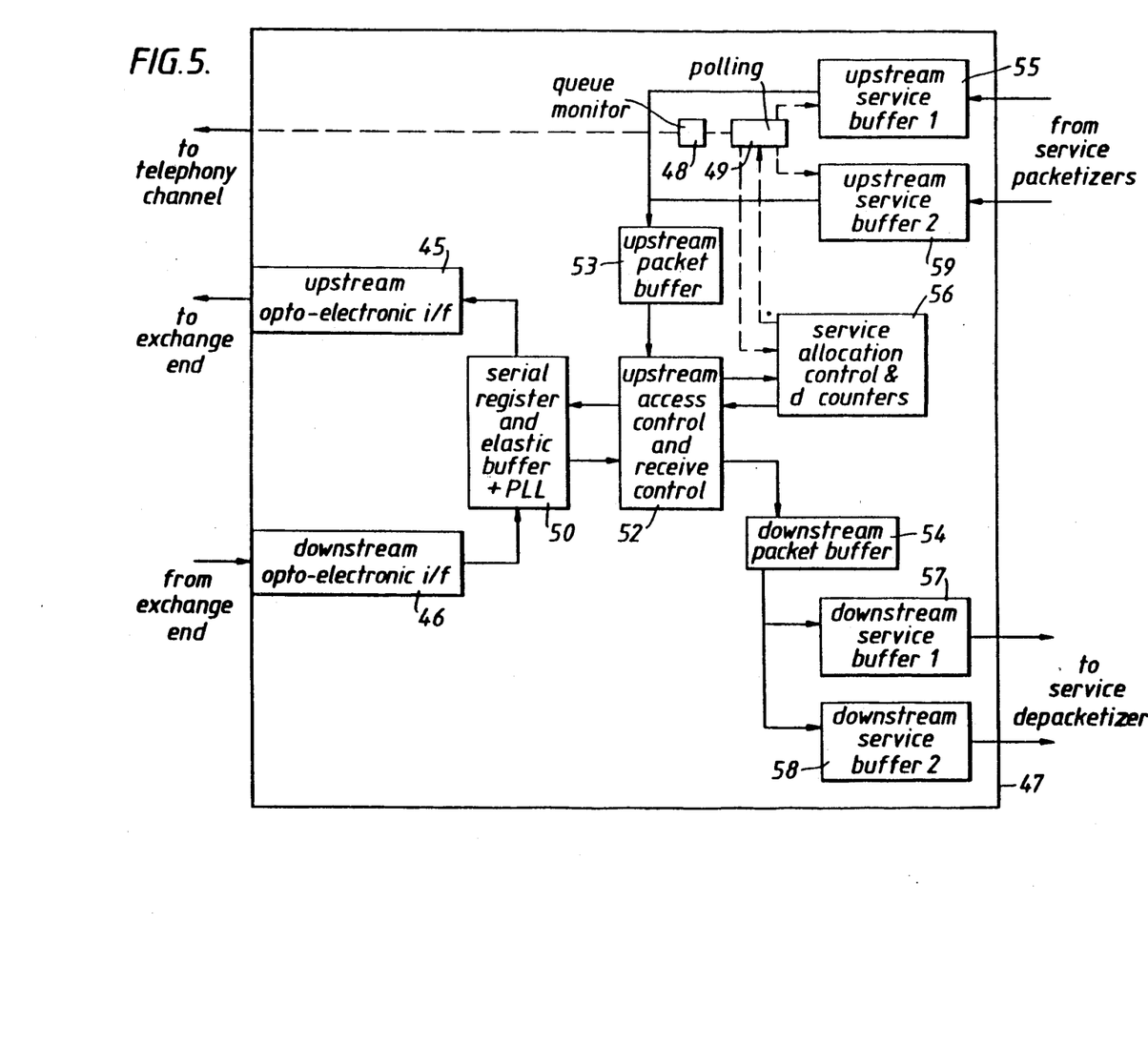
FIG. 5 shows the customer equipment of FIG. 4 in more detail.

Block 47 described in more detail in FIG. 5 will contain a phased-locked loop, locked to the ATD transmission from the local exchange end, and used to control the frequency of transmission in the upstream direction. Additionally, each block 47 will contain an elastic buffer. The local exchange end adjusts the size of this buffer so that there is an equal number of bits in each round-trip path (exchange end to any customer and back). Suitable signals to control the size of the elastic buffers are sent over the ATD channel to access control (47) from the local exchange end.

The configuration of FIG. 4 is shown in more detail in FIG. 5. The wavelength filters 20 of FIG. 4 cooperate with the downstream and upstream opto-electronic interfaces 46, 45. The electrical output of interface 41 is received by register/buffer block 50. The output of block 50 is available to interface 45. The block 50 also contains the phase locked loop locked to the ATD transmission from the local exchange end. The elastic buffer within block 50 ensures correct adjustment of the round trip delay. Control block 52 connected to block 50 will control upstream access as well as downstream control.

The downstream buffer 54 handles received packets passed via control 52 and the data is passed to the appropriate service buffers 57, 58. Buffer 57 may handle viewphone or voice information and buffer 58 may deal with bursty data for example. The received packets are then available for conversion in standard depacketizer for receipt by the customer as voice or other data. Viewphone or data for transmission back to the exchange end for example would be received (after conversion in to digital form as necessary and packetized) by buffers 55 and 59. Buffer 55 could handle viewphone or voice services for example and buffer 59 could handle other data. Data from these buffers can be made available for transmission dependent on polling block 49 which will operate under the control of allocation control 56. This polling and allocation will depend on the priority given to services associated with buffers 55 and 59 and the allocation allowance provided from the 'd' counters within block 56. In one embodiment additional information concerning packet arrivals in buffers 55 and 59 (waiting to be sent) is detected in monitoring block 48 and sent via the telephony channel (as represented by the broken line in FIG. 5 from queue monitoring block 48).

The packet information made available from buffers 61 and 62 passes to upstream packet buffer 53 to control 52 which will add information to the header to indicate 'd' allocation requirements (as described in more detail below) and thence to register/buffer 50 to interface 45 to pass along the optical medium to the exchange end.

In the downstream direction, the local exchange end transmits a continuous series of ATD cells, which may be full or empty. Typically each customer's equipment will extract cell synchronization from either specially recognizable synchronization cells injected regularly by the local exchange end, or from recognizing the known information content and header content of empty cells.

In the upstream direction, successive customer transmissions may differ in phase but should not differ in frequency. Therefore to ensure the local exchange receiver can maintain bit synchronization with respect to upstream transmissions, each cell will begin with sufficient bits so that the receiver can synchronize to any change of phase. A suitable line code, e.g. coded mark inversion (CMI), will be used in both directions of transmission.

Excluding the synchronization field (which is not considered to add more than a few per cent to the overall cell length, the cell size is around 36 octets, with a format as described below. The same cell size is used for upstream and downstream transmissions.

Figure 6:
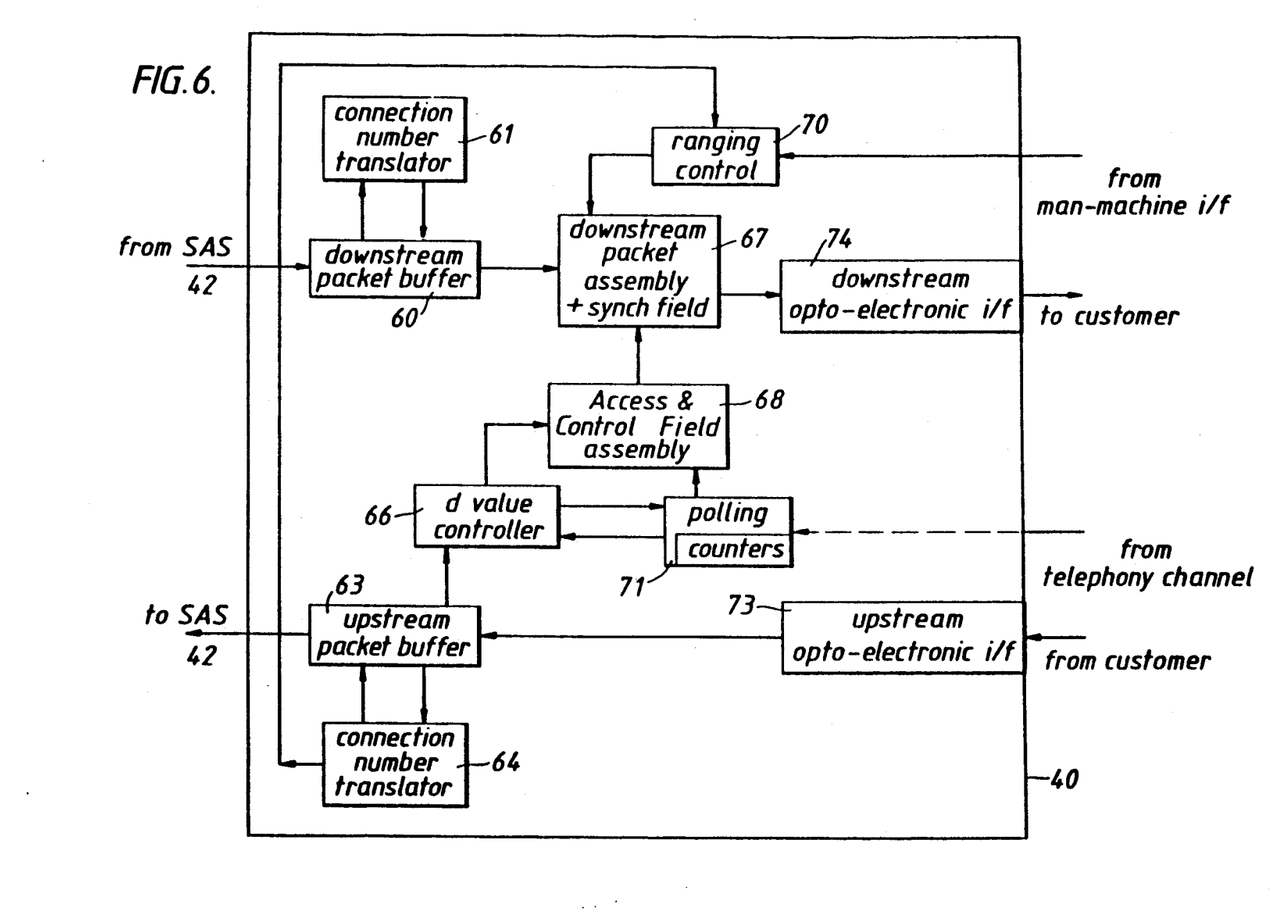
FIG. 6 shows the exchange end block 40 in more detail.

The downstream ATD block at the exchange end is shown in more detail in FIG. 6. The information from the service access switch 42 is received by packet buffer 60. Customer identification is taken care of by connection number translator 61. The assembly block 67 assembles the packet in the format required to meet cell size and synchronizing field requirements and this is made available to the customer via the opto-electronic interface 74. Ranging control 70 can also have access to assembler 67 to determine and set round-trip delay. The ranging parameters can be set via a man-machine interface for example. The connection number translator 64 detects incoming ranging control cells and passes this to block 70 to facilitate measurement of round trip delay. Ranging control can then if required send out further control cells via blocks 67 and 74 to the customer end to adjust the size of the elastic buffer within block 50 to ensure the round trip delay is identical with other customers. Additionally translator 64 holds connection number information identifying customers.

Assembler 68 provides the access and control field information respectfully to accompanying the packet information to identify customers and also identify the type of information being sent (e.g. ranging indication or normal data). Controller 66 has the stored 'd' value applicable to the amount of access available and extracts information from the headers of packets received from the customers via blocks 73 and 63 to determine the latest 'd' allocation requirements.

Figure 7:
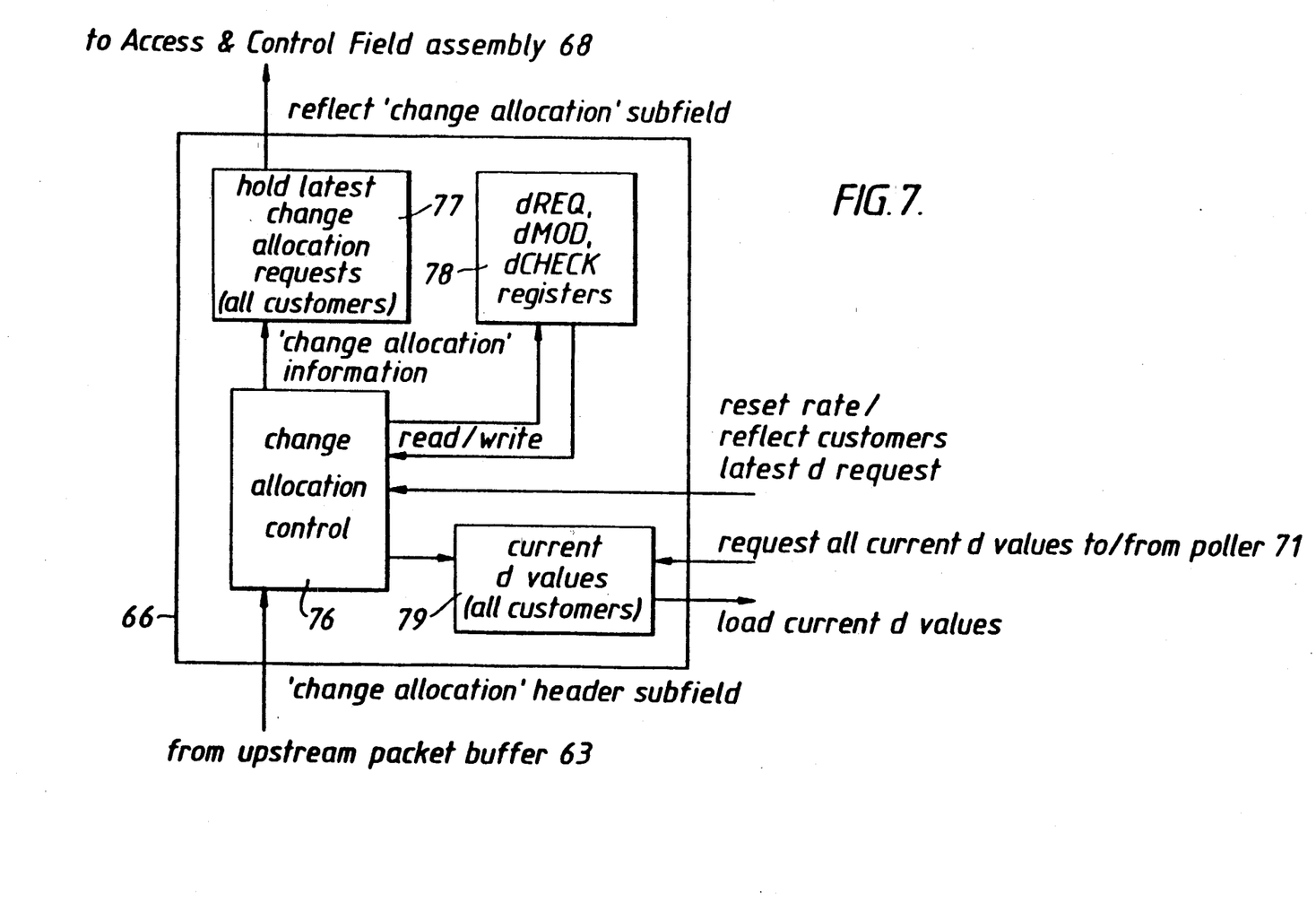
FIG. 7 shows the 'd' value controller of FIG. 6 in more detail.

The controller 66 is shown in more detail in FIG. 7. The change allocation control 76 receives the change allocation header subfield (as described below) from upstream packet buffer 63. Current 'd' values are stored for all customers in store 79. This is connected to poller 71 to allow loading of current 'd' values to the poller or to receive from the poller 71 a request for all current 'd' values. The poller 71 also provides a message to block 76 to reset rates or to initiate confirmation of the latest received "change allocation" information from a customer. Registers 78 have information on each customer concerning requests, modification or checks on any customer 'd' value. The latest allocation requests for all customers are held in store 77.

Returning to FIG. 6, additional received information from the customers is available via opto-electronic interface 73 and this passes to packet buffer 63. This buffer provides an output to the service access switch 42. The buffer 63 also is accessed by the translator 64 which translates customers connection numbers.

Figure 8:
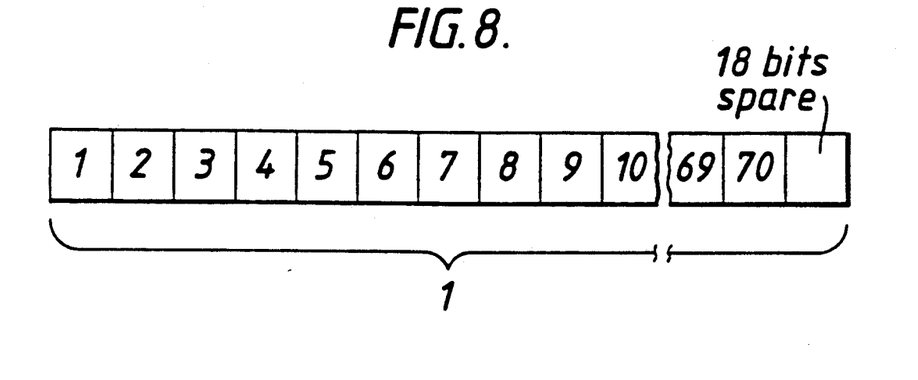
FIG. 8 shows a modified frame structure of the telephony channel to accommodate the ATD control information.
Figure 9:
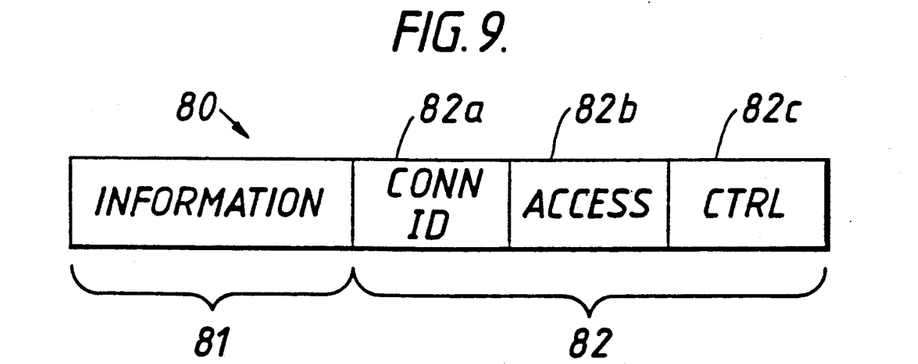
FIG. 9 shows the cell structure of FIG. 3.

Polling block 71 may make use of 'd' allocation information provided on the ATD channels and (in one embodiment) use the telephony channel (as represented by the broken lines) for polling customers who have indicated that packets are waiting. The telephony channel of FIG. 2 showed 17 subframe periods with a ranging capability within a single 2 ms frame and FIG. 8 is structured so that each customer has access to separate parts of the subframe (in this example subframe part 1) to enable both telephony and ATD users access to the telephony and ATD users access to the telephony channel (in one of the embodiments). As shown, the configuration is of 70 sectors each of 32 bits for ATD control or telephony plus 18 bits spare to give the 2258 channels of size 1 bit.

The two multiple-user ATD channels on wavelength λ3 will typically have the cell format shown in FIG. 8. Each packet 80 will be carried in the time slot structure in the system in either direction and will include an information field portion 81 and a header portion 82.

The header is provided with three sub-fields 82a-82c relating to the sub-fields of CONTROL, ACCESS, and CONNECTION ID respectively.

The 'ACCESS' sub-field 82b contains customer address information, to be used to control transmissions in the upstream direction. As the downstream ATD cells are sent from the local exchange end, each with a specific setting of the ACCESS field provided by block 68 of FIG. 6, a customer's equipment with matching address has the right to transmit one ATD cell in the upstream direction. The address value is set by the local exchange end based on information received about active terminals as described below. Thus this sub-field determines which customer is allowed to transmit next.

The Connector I.D. (CONN ID) 82a sub-field of the header contains a connection number (typically 16 bits) which is examined by the receiving circuitry of each customer's equipment (i.e. block 52) to determine whether the downstream cells should be kept or discarded. There is additionally a requirement to include some bits for label error detection/correction (e.g. 4–8 bits). Thus the CONN ID sub-field determines which customer receives a downstream cell.

The information field 81 has a size typically around 32 octets.

A suitable method of downstream mulitplexing can employ a time slot configuration described in European Patent Publication 0168265 for example, where 'd' packages can be assigned to users to prevent monopolising the network.

The control (CTRL) sub-field 82c of the header contains the following control information:
full/empty indication.
reset/transmit indication.
broadcast indication.
ranging indication.
priority indication.
change allocation.

On the ATD channel the local exchange end equipment can measure the round-trip delay to any customer and back. Such measurement periods are initiated by the local exchange end sending specially recognised 'ranging' cells, with the upstream ACCESS field (upstream right to transmit) set to the customer to be measured. A continuous train of such cells are sent from block 70 of FIG. 6 from the exchange end throughout the measurement period. This mode of operation is required so that the local exchange end can adjust the delay in the round trip path to ensure that upstream cells from different customers are correctly interleaved. However, ranging is considered to be only occasionally required and may be initiated via a man-machine interface as described above in relation to FIG. 6.

UPSTREAM MULTIPLEXING

(a) 1st Embodiment

In the first form of the embodiment the telephone channel is used to provide the local exchange with information about active terminals.

Because the original telephony channel is occassionally unavailable through ranging operations for telephony-only customers, as shown in the example frame structure of FIGS. 2 or 7, control of upstream polling is via two mechanisms:
- information from this telephony channel on packet arrivals
- polling 'recently' active users for their whole 'd' value.

On this channel, see FIG. 8, (originally only for telephony) each multiservice customer is assigned 70 bits per frame. This is further subdivided into 64 bits which are set according to packet arrivals, and a further 6 bits indicating the sum of all packet arrivals in the last frame period.

The 70 bits are dispersed regularly throughout the frame such that any adjacent group of 32 bits on this channel carries 1 bit from each of the broadband customers. If an ATD cell arrives for upstream transmission on a customer's equipment, this is indicated to the local exchange end by setting one bit, i.e. that customer's next assigned bit in the current frame. Further packet arrivals will be likewise indicated. In this way, the local exchange end receives updated information about waiting cells on each customer's equipment approximately every 1.5 microseconds (apart from the ranging period of the telephony channel).

(b) 2nd Embodiment

In the second form of the embodiment, which does not require the use of the telephony channel the upstream multiplexing is controlled from the local exchange and based on two mechanisms.
- polling on each customer' control channel exactly once every 4 milliseconds
- polling all active customers at least once every 125 microseconds for their permitted allocation (i.e. their 'd' value—see below)

The polling is effected by blocks 71 and 68 of FIG. 6. For the purposes of polling, the local exchange access controller 68 regards each customer's access equipment as two devices. At the customer's end these two 'devices' are the separate responses of the access equipment to two different ACCESS addresses which it will match with.

The first 'device' is the allocation control (Control 56 and block 52 of FIG. 5) which is responsible for sending all 'change allocation' messages to the controller at the local exchange, via appropriate settings of the header. As stated above, it has a guaranteed access rate of one cell every 4 milliseconds. User data (e.g. signalling information) can be included in the information field provided the header is also set to 'full'. In this case the data part is treated as belonging to the connection whose identity is given by CONN ID.

The frequency of these transmissions from all customers' equipments may be used to provide a minimum level of monitoring of the round-trip delay so as to compute any necessary fine tuning to be conveyed to the customer's equipment.

The second 'device' comprises the control 52 and buffer 53 and is always considered to be active by the controller at the local exchange, and is given a permitted upstream allocation—which may include zero. Changing the allocation of this device is the method by which the customer's equipment gains an appropriate upstream access rate for its queues.

Whenever a customer is polled on either 'device' it must return either a 'full' cell or 'empty' cell and repeat the value in the ACCESS field. For all upstream transmissions the transmitting source is identified at the local exchange through the setting of ACCESS.

To service waiting queues at the customer's end, any downstream cell with either of the two matching values of ACCESS causes the next waiting cell to be transmitted upstream. This upstream cell will then be set to be transmitted upstream. This upstream cell will then be set to 'full' and the CONN ID value will be set to the appropriate connection number. In addition, if the ACCESS field matches the control channel then the 'change allocation' part of the header is appropriately set.

The 8 settings of the 'change allocation' field are:
- increase 'd' by 1/ repeat increase 'd' by 1
- no change/ repeat no change
- decrease 'd' by 1/repeat decrease 'd' by 1
- 'd' equals zero/ repeat 'd' equals zero Whenever a 'change allocation' message is sent from the customer's end the information is repeated by the controller at the local exchange. It is inserted in the 'change allocation' field of the next poll request sent downstream on the same ACCESS channel number via blocks 76 and 77 of FIG. 7. This allows the customer's access equipment to check that the information it sent last time was correctly received. If there is any error the customer's end sends a 'repeat' type setting (see the above settings) and records the error. (The repeat type setting is not used in the first embodiment case).

To ensure that any repeat-type 'change allocation' messages are correctly responded to, the local exchange controller (block 66) maintains 3 registers 78 for each customer, i.e. dREQ, dCHECK, and dMOD as shown in FIG. 7. The register dREQ determines the current allocation (as described in the next section), the other two registers contain intermediate values. The rules governing the use of these 3 registers are set out in Table 1.

TABLE 1

| CHANGE ALLOCATION MESSAGES - RESPONSE AT LOCAL EXCHANGE | | |
|---|---|---|
| CUSTOMER SENDS | FOLLOWED BY (4 ms later) | REGISTER CHANGES IN LOCAL EXCHANGE CONTROLLER |
| OPERATION (eg NO CHANGE) | OPERATION' (eg INCREASE d BY 1) | dCHECK first loaded into dREQ perform OP' on dREQ and load result in dCHECK |
| OPERATION | REPEAT OPERATION' | perform OP' on dREQ and load result in dMOD |
| REPEAT OPERATION | OPERATION' | dMOD first loaded into dREQ perform OP' on dREQ and load result in dCHECK |
| REPEAT OPERATION | REPEAT OPERATION' | perform OP' on dCHECK and load result in dMOD |

This scheme fully corrects any isolated case of an incorrectly received control message, in either the upstream or downstream direction. In combination with a limited error correction field in all ATD headers (e.g. correcting any single bit error), the number of cases where the allocation is incorrectly set is expected to be extremely small.

Entry into the state where the allocation is zero is always performed by the use of the 'd' equals zero operation, rather than decrease 'd' by 1. This absolute setting provides an additional safeguard against the local exchange dREQ register being in long term misalignment with the value held at the customer end.

As well as knowing where cells are waiting, the exchange end also operates a scheme which provides guaranteed access to each customer every 125 microseconds. The exchange end block 79 stores an integer value, known as 'd' value, for each customer which is the number of cells the customer requires to be guaranteed to be transmitted upstream every 125 microseconds. Every time a customer is polled by block 71 an associated counter in block 71 is decremented, starting from the value 'd'. When the counter reaches zero, the customer cannot be polled even if he has further cells waiting. Polling of that customer can only begin again after the local exchange end control block 66 via block 79 has 'reset' all counters within poller 71. In the case of the first embodiment, this condition is reached when the local exchange end has no more customers which it may validly poll (either because no more cells are waiting or all customers have exhausted their 'd' values).

In the second embodiment each customer is polled until his 'd' counter in poller 71 reaches zero, regardless of whether he has packets waiting. When his counter reaches zero, the customer cannot be polled until the polling of all other customers has been completed. This includes any allocation control devices which are due to be polled (nb. assuming 32 customers, one such control device is due to be polled every 125 microseconds). When no further customers can be polled the controller 66 via block 79 resets all counters.

Similarly, in the first embodiment during the ranging periods of the telephony channel, the local exchange end will poll (via block 71) all customers who have been active during the last frame. Polling will continue to the level of each customer's 'd' value regardless of whether they have cells waiting or not. Then the local exchange end 66 will reset all its counters and block 71 begin polling again according to the same pattern.

Whenever the local exchange end performs a reset of the counters, it indicates this to all customers' equipments by setting the control field of a downstream cell to indicate 'reset'. This information is used by each customer's equipment to reset different service queues of waiting cells to control the amount of cells which any one service queue can submit for upstream transmission.

In the first embodiment, every customer is given an initial 'd' value of 1, and this guarantee of access is maintained. For cells with an information field of 32 octets, a 'd' of 1 is equivalent to primary rate access to all 32 customers on demand.

In the second embodiment, an idle customer will have a 'd' value of zero to prevent unnecesary polling, but every customer is guaranteed a 'd' value of 1 on demand (via blocks 56, 52, 50 and 45 to the exchange end blocks 73, 63 and 66), therefore no customer may increase his guaranteed access rate to a level where other customers could be refused a minimum 'd' of 1.

The controller 66 at the local exchange may receive requests from block 56 to increase a customer's 'd' value via the 'change allocation' setting. It will comply with this request provided the current level of guaranteed access is not already equal to the available capacity (i.e. approximately 65 cells every 125 microseconds, given a gross bit rate of around 150 Mbit/s).

For example, to determine the correct allocation for the variable bit rate services (data, VBR video), the customers equipment block 56 via block 60 will measure the number of cell arrivals, say every 4 milliseconds. If the number of arrivals exceeds the current 'd' (or part of 'd' assigned to these services) the customer's equipment as just described will signal to the local exchange end for an increase in its 'd' allocation. As already stated, the local exchange end will comply with this request if possible, but will not allow already allocated bandwidth to be used.

In the case of the first embodiment, change allocation information is supplied whenever the customer is next polled having first indicated that a packet is waiting via the telephony channel. Again in the case of the first embodiment occasionally the customers' equipment will generate a signalling call to verify its current 'd' requirements and ensure that the local exchange end remains in step with all recent changes. The frequency of these transmissions from all customers' equipments may be used to provide a minimum level of monitoring of the round-trip delay so as to compute any necessary fine tuning to be conveyed to the customers' equipment via the ordinary telephony channel.

To signal to the local exchange end the customer's equipment sends an 'increase d' setting on its next upstream control cell.

In the case of the second embodiment, the local exchange end block 66 maintains both a copy of each customer's ideal requirements in the dREQ register and also holds the permitted 'd' value in another register in block 66. Normally 'd' is set equal to dREQ. However, 'd' may be held less than dREQ until additional capacity becomes free. When this happens, any customer 'd' value which is less than its dREQ can be increased by 1 via block 76 (and no 'd' can be increased by 2 until all other such customers have received an increase of 1).

The delay experienced by a cell will depend upon its service priority and the allocation of the total 'd' value (for a given customer) which has been assigned to its service queue. In the case of the first embodiment, the delay is composed of two parts:
- a round-trip delay to indicate the cell arrival to the exchange end and receive permission to transmit from the exchange end.
- a random waiting period. This would be typically less than 10 microsecpnds (and would never be more than 125 microseconds for those cells requiring guaranteed access).

In the case of the second embodiment because the local exchange end does not wait for an arriving call indication before polling, the random component of delay is the only component arising in this case.

Thus the ATD channel is capable if carrying a wide mix of services, some bursty and some requiring guaranteed bandwidth. It may be used in an environment where there are some telephony-only customers on the original channel mixed with other customers whose services have migrated onto the ATD channel.

The propose channels would allow the flexible use of bandwidth to carry dialogue services as they evolve. The migration from narrow band to broadband to the ATD situation could be effected in stages as required.

Although the passive network has been described in terms of optical fibre, other configurations e.g. copper cable or wire-less transmission coulld be envisaged.

Although end 15 of FIG. 3 has been described as the exchange end, this term is meant to encompass a location where multiple packet handling is arranged for a number of remote users (sometimes called a head end).

I claim:

1. A bidirectional broadband and telephony network controllable from an end of the network including means (67) at the end of the network for allocating time slots for information packets to travel without interference to and from a plurality of receiving stations, wherein the allocating means includes means (70) for determining round-trip delay between the end of the network and each of the receiving stations and means (70) for adjusting the round-trip delay to ensure correct spacing of the information packets during passage through the network and includes means (71, 66) for interrogating stations and enforcing allocation thereto to ensure each station's minimum bandwith requirements is fulfilled, and, means (71) for dynamically allocating spare capacity to each station for bursty services.

2. A network as claimed in claim 1 wherein the means for allocating time slots including means (67) at the end of the network for generating a continuous series of cells, means (74) for transmitting said cells, means (61) for routing information to be carried to the receiving stations in selected cells and means (68) for generating information within a header portion of a cell to allow a designated station access to transmit an information packet using that cell or retain an information packet from that cell.

3. A network as claimed in claim 2 wherein the means for generating information includes means (61) for generating station identification information in the cell header indicative of a receiving station and means (61) for generating a connection number for receipt by each station.

4. A network as claimed in claim 1, wherein the allocating means includes means (68) for generating control information indicative of the presence and type of information contained in each cell for receipt by the receiving stations.

5. A network as claimed in claim 4 wherein the means for generating control information includes means (68) for generating a cell full/empty indicator, means (68, 71) for generating a reset/transmit indicator for service access, and means (61, 67) for generating a broadcast indicator to allow all customers to retain the received packet.

6. A network as claimed in claim 4 wherein the means for generating control information includes means (61, 67) for generating a priority indicator.

7. A network as claimed in claim 4 wherein the means for generating control information includes means for (66) for generating a change in allowed allocation.

8. A network as claimed in claim 1 wherein each station includes means (56, 52) for requesting an alteration in its amount of access.

9. A network as claimed in claim 1 wherein polling means (71) are provided at the end of the network for repeatedly polling each station to determine current user requirements.

10. A network as claimed in claim 9 wherein each station includes means (56, 52) for requesting a change in transmission access and the end of the network includes means (66) for responding to the request to change allocation or to maintain or decrease allocation and generator means (66, 71) are provided for generating information to the requesting station indicative of any change.

11. A network as claimed in claim 10 wherein the requesting means includes detector means (77, 76, 52) for checking the received allocation changes and means (52) for generating a further request if an error is detected.

12. A network as claimed in claim 10 wherein the requesting means includes an allocation request store (78), an allocation check store (78) and an allocation modification store (78).

13. A network as claimed in claim 9 wherein the polling means (71) includes counter means (71) for decrementing the allocation of each station on handling each cell until its allocation is exhausted and means (66, 71) for resetting the counter means when no further stations have allocation remaining and/or no further cells from or for any station are waiting to be transmitted.

14. A network as claimed in claim 9 wherein the polling means (71) is configured to effect access via the telephony channel.

15. A network as claimed in claim 1 wherein the means for determining the round trip delay includes means (70, 67) for transmitting ranging signals during a measuring period.

16. A network as claimed in claim 1, wherein the means for adjusting the round trip delay includes a phased lock loop (50) at each station to ensure synchronization and an elastic buffer (50) controllable by the end of the network to ensure an equal number of bits in each round trip path from any station.

17. A network as claimed in claim 1, wherein a telephony channel is provided and interface means (48) are provided thereto to convey information on the transmission requirement of a station.

18. A network as claimed in claim 17 wherein the interface means includes means (48, 71) for determining packet arrivals at respective stations, and means (71) for polling stations for their allocation requirements dependent on information queuing therein.

19. A network as claimed in claim 1, wherein information on the transmission requirements of a station are sent in the header of information packets.

20. A network as claimed in claim 1, wherein switching means (42) at the end of the network are provided for handling incoming and outgoing information on a multiplexed basis.

21. A network as claimed in claim 20, wherein the switching means (42) is configured to handle information on an asynchronous time division basis on a single common wavelength.

22. A network as claimed in claim 1, wherein each station includes wavelength filter means (20) to permit receipt of broadband packet information.

23. A network as claimed in claim 1, wherein each station includes buffer means (50, 53, 54) for temporarily holding information sent or received and means (52) for arranging said information into the cell format required.

24. A network as claimed in claim 1, wherein the network is configured using an optical medium and an optical/electrical interface (45, 46) is provided at each station.

25. A network as claimed in claim 24 wherein the end of the network includes an optical/electrical interface (73, 74).

26. A network as claimed in claim 1, wherein the means (71, 66) for enforcing allocation includes means (66) for providing at least a minimum access on request by a station and means (66, 71) for maintaining at least such allocation till it is no longer required thereby and means (66) for providing at least a minimum access to further stations to ensure all requesting stations some access regardless of bandwidth constraints.

27. A network as claimed in claim 1 including means (61, 64) at the end of the network for translating a connection number of an incoming/outgoing packet to/from the associated station.

28. A network as claimed in claim 1, wherein each station includes means (56) for calculating the access requirements from current traffic information to determine if an increased allocation is required.

29. A network as claimed in claim 1, wherein cell generator means (64, 63) at an end of the network are configured to generate cells in the form of ATD cells complete with an information header portion.

30. A method of controlling a bidirectional broadband and telephone network from an end of the network including allocating at the end of the network time slots for information packets to travel without interference to and from a plurality of receiving stations, the allocation including determining round-trip delay between the end of the network and each of the receiving stations; adjusting the round-trip delay to ensure correct spacing of the information packets during passage through the network; interrogating stations and enforcing allocation thereto to ensure each station's minimum bandwidth requirements is fulfilled; and, dynamically allocating spare capacity to each station for bursty services.

31. A method as claimed in claim 30 including generating at the end of the network a continuous series of cells, transmitting said cells, routing information to be carried to the receiving stations in selected cells and generating information within a header portion of a cell to allow a designated station access to transmit an information packet using that cell or retain an information packet from that cell.

32. A method as claimed in claim 31 including generating station identification information in the cell header indicative of a receiving station and generating a connection number for receipt by each station.

33. A method as claimed in claim 30, wherein the allocation includes generating control information indicative of the presence and type of information contained in each cell for receipt by the receiving stations.

34. A method as claimed in claim 33 wherein the control information generation step includes generating a cell full/empty indicator, generating a reset/transmit indicator for service access, and generating a broadcast indicator to allow all customers to retain the received packet.

35. A method as claimed in claim 33 wherein the generating control information step includes generating a priority indicator.

36. A method as claimed in claim 33, wherein the control information step includes generating a change in allowed allocation.

37. A method as claimed in claim 30 including at any station the step of requesting an alteration in its amount of access for transmission determined by the exchange end.

38. A method as claimed in claim 30 including repeatedly polling each station to determine current user requirements.

39. A method as claimed in claim 38 including requesting from any station a change in transmission access and responding from the end of the network to the request to change allocation or to maintain or decrease allocation and generating information to the requesting station indicative of any change.

40. A method as claimed in claim 39 wherein the requesting step includes checking the received allocation changes and for generating a further request if an error is detected.

41. A method as claimed in claim 38 wherein the polling step includes decrementing the allocation of each station on handling each cell until its allocation is exhausted and reallocating the stations when no further stations have allocation remaining and/or no further cells from or for any station are waiting to be transmitted.

42. A method as claimed in claim 30 includes transmitting ranging signals during a measuring period to determine the round trip delay, and generating a signal to adjust an elastic buffer at any station to equalize the round trip delay of all stations.

43. A method as claimed in claim 30, wherein information on the transmission requirements of a station are sent in the header of information packets.

44. A method as claimed in claim 30, including multiplexing incoming and outgoing information at the end of the network on an asynchronous time division basis on a single common wavelength.

45. A method a claimed in claim 30 including providing an optical transmission medium and interfacing electrical signals thereto at both the end of the network and each station.

46. A method as claimed in claim 30, including providing at least a minimum access on request by a station and maintaining at least such allocation till it is no longer required thereby and providing at least a minimum access to further stations to ensure all requesting stations some access regardless of bandwidth constraints.

47. A method as claimed in claim 30, including translating at the end of the network a connection number of an incoming/outgoing packet to/from the associated station.

48. A method as claimed in claim 30, including calculating at each station the access requirements from current traffic information to determine if an increased allocation is required.

49. A method as claimed in claim 30, including generating cells at the end of the network in the form of ATD cells complete with an information header portion.

* * * * *